(12) United States Patent
Chikagawa et al.

(10) Patent No.: US 8,936,069 B2
(45) Date of Patent: Jan. 20, 2015

(54) VEHICLE HEATING VENTILATION AND AIR CONDITIONING UNIT

(75) Inventors: Noriyuki Chikagawa, Aichi (JP); Tomoki Izawa, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1200 days.

(21) Appl. No.: 12/747,574

(22) PCT Filed: May 27, 2009

(86) PCT No.: PCT/JP2009/059662
§ 371 (c)(1),
(2), (4) Date: Jun. 11, 2010

(87) PCT Pub. No.: WO2009/145215
PCT Pub. Date: Dec. 3, 2009

(65) Prior Publication Data
US 2010/0263828 A1    Oct. 21, 2010

(30) Foreign Application Priority Data

May 29, 2008    (JP) ................................. 2008-141434

(51) Int. Cl.
*B60H 1/00* (2006.01)
(52) U.S. Cl.
CPC ........ *B60H 1/00028* (2013.01); *B60H 1/00678* (2013.01); *B60H 2001/00092* (2013.01); *B60H 2001/00185* (2013.01)
USPC ................ 165/42; 165/43; 165/204; 454/121; 454/126; 454/156; 454/160; 454/161; 237/12.3 A; 237/12.3 B
(58) Field of Classification Search
USPC .............. 165/204, 42, 43; 454/121, 126, 156, 454/160, 161; 237/12.3 A, 12.3 B
See application file for complete search history.

(56) References Cited

U.S. PATENT DOCUMENTS

| 6,296,563 | B1 * | 10/2001 | Vincent ......................... 454/121 |
| 6,520,850 | B1 * | 2/2003 | Buckman et al. ............. 454/121 |
| 2004/0203333 | A1 | 10/2004 | Yeon | |

FOREIGN PATENT DOCUMENTS

EP    2030818 A1    3/2009
FR    2778152 A1 * 11/1999
(Continued)

OTHER PUBLICATIONS

International Search Report of PCT/JP2009/059662, Mailing Date of Jun. 23, 2009.

(Continued)

*Primary Examiner* — John Ford
(74) *Attorney, Agent, or Firm* — Westerman, Hattori, Daniels & Adrian, LLP

(57) ABSTRACT

Provided is a vehicle heating ventilation and air conditioning unit capable of improving the performance of a side demister in a foot mode where a DEF damper is set to a small degree of opening, and capable of securing window clearness of side window glass. In a vehicle heating ventilation and air conditioning unit (1) that is configured so as to selectively blow out an air flow whose temperature has been regulated by an evaporator (4) and a heater (5) mounted in an air channel (3) from a DEF blowing channel (17), a face blowing channel (16), and a foot blowing channel (18), which are at downstream of the evaporator (4) and the heater (5), into a cabin by opening and closing a DEF damper (8), a face damper (7), and a foot damper (9), side demister channels (31) that guide the temperature-regulated air to the side window glass are provided at both side portions of the DEF blowing channel (17), and baffle ribs (36) that guide the temperature-regulated air to the side demister channels (31) are provided in the vicinity of both end portions of the DEF damper (8) that opens and closes the DEF blowing channel (17) and the side demister channels (31) simultaneously.

4 Claims, 6 Drawing Sheets

(56) References Cited

FOREIGN PATENT DOCUMENTS

| | | |
|---|---|---|
| JP | 53-084849 U | 7/1978 |
| JP | 58-098217 U | 7/1983 |
| JP | 61-027716 A | 2/1986 |
| JP | 62-083710 U | 5/1987 |
| JP | 2-064413 U | 5/1990 |
| JP | 2001-213135 A | 8/2001 |
| JP | 2003267028 A * | 9/2003 |
| JP | 2006088765 A * | 4/2006 |
| JP | 2006123564 A * | 5/2006 |

OTHER PUBLICATIONS

Supplementary European Search Report dated Oct. 13, 2011, issued in corresponding European Patent Application No. 09754723.6.

* cited by examiner

VEHICLE HEATING VENTILATION AND AIR CONDITIONING UNIT

TECHNICAL FIELD

The present invention relates to a vehicle heating ventilation and air conditioning unit that is provided with a defroster and a side demister that prevents and clears fogging of windshield and side window glass.

BACKGROUND ART

A conventional vehicle heating ventilation and air conditioning unit (Heating Ventilation And Air Conditioning Unit; HVAC unit) is generally configured so as to selectively blow out an air flow whose temperature has been regulated by an evaporator, an air-mix damper, and a heater mounted in an air channel within a unit case into a cabin from a DEF blowing channel, a face blowing channel, and a foot blowing channel that are provided with a DEF damper, a face damper, and a foot damper located downstream of the evaporator, the air-mix damper, and the heater.

Those provided with a side demister that blows out temperature-regulated air towards the side window glass in addition to a defroster that blows out the temperature-regulated air from a DEF blowing channel towards the windshield are configured so that side demister channels that guide the temperature-regulated air to the side window glass are formed at both the right-side portion and the left-side portion of the DEF blowing channel, or so that, as shown in PTL 1, end portions of the side demister ducts are inserted into and retracted from both the right-side portion and the left-side portion of a defroster nozzle body connected to an air conditioning unit, and the shapes of the end portions are orientated so as to face against the flow of the temperature-regulated air within the defroster nozzle body.

With the HVAC unit described above, by opening and closing the DEF damper, the face damper, and the foot damper, the blowing mode of the temperature-regulated air can be selected from any of a DEF mode where the DEF damper is opened, a face mode where the face damper is opened, a foot mode where the foot damper is opened, a DEF/foot mode where both the DEF damper and the foot damper are opened, and a bi-level mode where both the face damper and the foot damper are opened. In the foot mode, which is a heating mode, in order to prevent and clear fogging of the windshield and the side window glass, the DEF damper is set to a small degree of opening, and temperature-regulated air that is about 10 to 20% of the total airflow in the foot mode is supplied towards the DEF blowing channel and the side demister channels.

CITATION LIST

Patent Literature

{PTL 1}
Japanese Unexamined Patent Application Publication No. 2001-213135

SUMMARY OF INVENTION

Technical Problem

However, in the foot mode, the proportion of the temperature-regulated air that is supplied to the DEF blowing channel and the side demister channels through the DEF damper, which is set to a small degree of opening, is as low as approximately 10 to 20% of the total airflow in the foot mode, and in addition, when this temperature-regulated air flows through the small gap between the unit case and both end portions of the DEF damper, the temperature-regulated air flows in the width direction of the DEF damper from the gap between the unit case and both of those end portions. This is thought to be due to the fact that the direction of the temperature-regulated air flowing along both side portions of the unit case is changed to the width direction by a sealing surface of the unit case against which both end portions of the DEF damper are abutted, and then the temperature-regulated air flows in the width direction of the DEF damper by being dragged by the temperature-regulated air flowing in the central portion of the DEF blowing channel serving as the main stream.

Therefore, since the temperature-regulated air hardly flows towards the side demister channels, and the temperature at the side demister channels will not be increased even when the blow-out temperature is set to max-hot (maximum heating), there is a problem in that window clearness of the side window glass cannot be ensured. This problem remains the same even with the configuration as shown in PTL 1, and although increasing the insertion and protrusion lengths of the side demister ducts into the defroster nozzle to improve the performance of the side demister has been considered, a problem occurs in that the side demister duct will act as resistance in the DEF mode and the DEF/foot mode, thereby becoming a cause of increased noise and so forth.

Therefore, for example, although an operation for manually switching to the DEF/foot mode and so forth is performed when window clearness is not ensured by the side demisters, this operation is troublesome, and thus, a side demister that is capable of ensuring window clearness of the side window glass reliably in the foot mode where the DEF damper is set to a small degree of opening is desired.

The present invention has been conceived in light of such a situation, and an object thereof is to provide a vehicle heating ventilation and air conditioning unit that is capable of improving the performance of the side demister and ensuring window clearness of the side window glass, when the DEF damper is set to a small degree of opening in the foot mode.

Solution to Problem

In order to solve the problems described above, the vehicle heating ventilation and air conditioning unit of the present invention employs the following solutions.

In other words, the vehicle heating ventilation and air conditioning unit according to one aspect of the present invention is a vehicle heating ventilation and air conditioning unit that is configured so as to selectively blow out an air flow whose temperature has been regulated by an evaporator and a heater mounted in an air channel from a DEF blowing channel, a face blowing channel, and a foot blowing channel, which are provided downstream of the evaporator and the heater, into a cabin by opening and closing a DEF damper, a face damper, and a foot damper; the vehicle heating ventilation and air conditioning unit includes side demister channels that are provided at both side portions of the DEF blowing channel so as to guide the temperature-regulated air to side window glass, and baffle ribs that are provided in the vicinity of both end portions of the DEF damper that opens and closes the DEF blowing channel and the side demister channels simultaneously so as to guide the temperature-regulated air to the side demister channels.

According to the aspect described above, in the foot mode, which is a heating mode, in order to prevent and clear fogging of the windshield and side window glass, when the DEF damper in the DEF blowing channel is set to a small degree of opening and the temperature-regulated air is made to flow though the DEF blowing channel and the side demister channels, the temperature-regulated air can be reliably guided to the side demister channels by the baffle ribs provided in the vicinity of both end portions of the DEF damper. Therefore, it is possible to improve the performance of the side demister merely by adding the baffle ribs to the DEF damper and to increase window clearness of the side window glass, and at the same time, it is possible to solve the problem of the manual operation of switching the damper to the DEF/foot mode for ensuring window clearness.

According to the vehicle heating ventilation and air conditioning unit according to the one aspect of the present invention, in the vehicle heating ventilation and air conditioning unit described above, the baffle ribs have a function of guiding the temperature-regulated air flowing in the width direction of the DEF damper to the side demister channels from the gap between both end portions of the DEF damper and the unit case, when the DEF damper is set to a small degree of opening in a foot mode where the foot damper is opened and the temperature-regulated air is blown out from the foot blowing channel.

According to the aspect described above, when the DEF damper is set to a small degree of opening in the foot mode, which is a heating mode, since the temperature-regulated air flowing at both sides of the air channel flows in the width direction of the DEF damper from the gap between both end portions of the DEF damper and the unit case upon passing through the DEF damper, it is possible to increase the airflow of the temperature-regulated air flowing at the side demister channels by guiding the temperature-regulated air to the side demister channels with the baffle ribs. Therefore, without increasing the airflow proportion to be flown in the DEF blowing channel and the side demister channels, it is possible to supply an airflow that can ensure sufficient demister performance into the side demister channels, and therefore, it is possible to ensure the performance of the side demister while simultaneously maintaining the heating performance.

According to the vehicle heating ventilation and air conditioning unit according to the one aspect of the present invention, in any of the vehicle heating ventilation and air conditioning units described above, the baffle ribs are provided at locations of substantially around 50% of the distance relative to the widthwise dimension of the side demister channels from both end portions of the DEF damper.

According to the aspect described above, by providing the baffle ribs at locations of substantially around 50% of the distance relative to the widthwise dimension of the side demister channels from both end portions of the DEF damper, without increasing pressure loss (resistance) against the temperature-regulated air flowing in the width direction of the DEF damper from the gap between both end portions of the DEF damper and the unit case, it is possible to guide the temperature-regulated air into the side demister channels so that the temperature-regulated air does not pass the side demister channels. Therefore, temperature-regulated air of the adequate airflow can be guided to the side demister channels, and the performance of the side demister can be stabilized.

According to the vehicle heating ventilation and air conditioning unit according to one aspect of the present invention, in any of the vehicle heating ventilation and air conditioning units described above, the baffle ribs are provided on the sealing surface-side surface of the DEF damper in an upright position.

According to the aspect described above, since the baffle ribs are provided in an upright position on the sealing surface-side surface of the DEF damper, by adjusting the vertical height of the baffle ribs within a range such that they do not protrude from the unit case of the heating ventilation and air conditioning unit, it is possible to adjust the airflow of the temperature-regulated air to be guided to the side demister channels. Therefore, the optimization of the airflow to be guided to the side demister channels is possible by adjustment of the vertical height of the baffle ribs.

According to the vehicle heating ventilation and air conditioning unit according to one aspect of the present invention, in any of the vehicle heating ventilation and air conditioning units described above, the baffle ribs are provided in the direction orthogonal to the width direction of the DEF damper.

According to the aspect described above, since the baffle ribs are provided in the direction orthogonal to the width direction of the DEF damper, it is possible to effectively guide the temperature-regulated air flowing in the width direction of the DEF damper from the gap between both end portions of the DEF damper and the unit case to the side demister channels with the baffle ribs. In the DEF mode and the DEF/foot mode where the DEF damper is opened to blow out the main stream of the temperature-regulated air from the DEF blowing channel and the side demister channels, the baffle ribs will not cause resistance, and therefore, the performance of parts other than the side demister will not be adversely affected.

According to the vehicle heating ventilation and air conditioning unit according to one aspect of the present invention, in any of the vehicle heating ventilation and air conditioning units described above, the baffle ribs are integrally molded with the DEF damper with resin material.

According to the aspect described above, since the baffle ribs are molded integrally with the DEF damper with resin material, the number of processes in the production of the DEF damper will not be increased even if the baffle ribs are provided. Therefore, an improvement in the performance of the side demister can be afforded while preventing an increase in production costs.

Advantageous Effects of Invention

According to the present invention, when the DEF damper in the DEF blowing channel is set to a small degree of opening, and the temperature-regulated air is made to flow through the DEF blowing channel and the side demister channels, the temperature-regulated air can be reliably guided to the side demister channels by the baffle ribs provided in the vicinity of both end portions of the DEF damper. Therefore, it is possible to improve the performance of the side demister only by adding the baffle ribs to the DEF damper and to increase window clearness of the side window glass, and at the same time, it is possible to solve the problem of the manual operation of switching the damper to the DEF/foot mode for ensuring window clearness.

DESCRIPTION OF EMBODIMENTS

Embodiments according to the present invention will be described below, with reference to the drawings.

First Embodiment

A first embodiment of the present invention will be described below using FIGS. 1 to 5.

Figure 1:
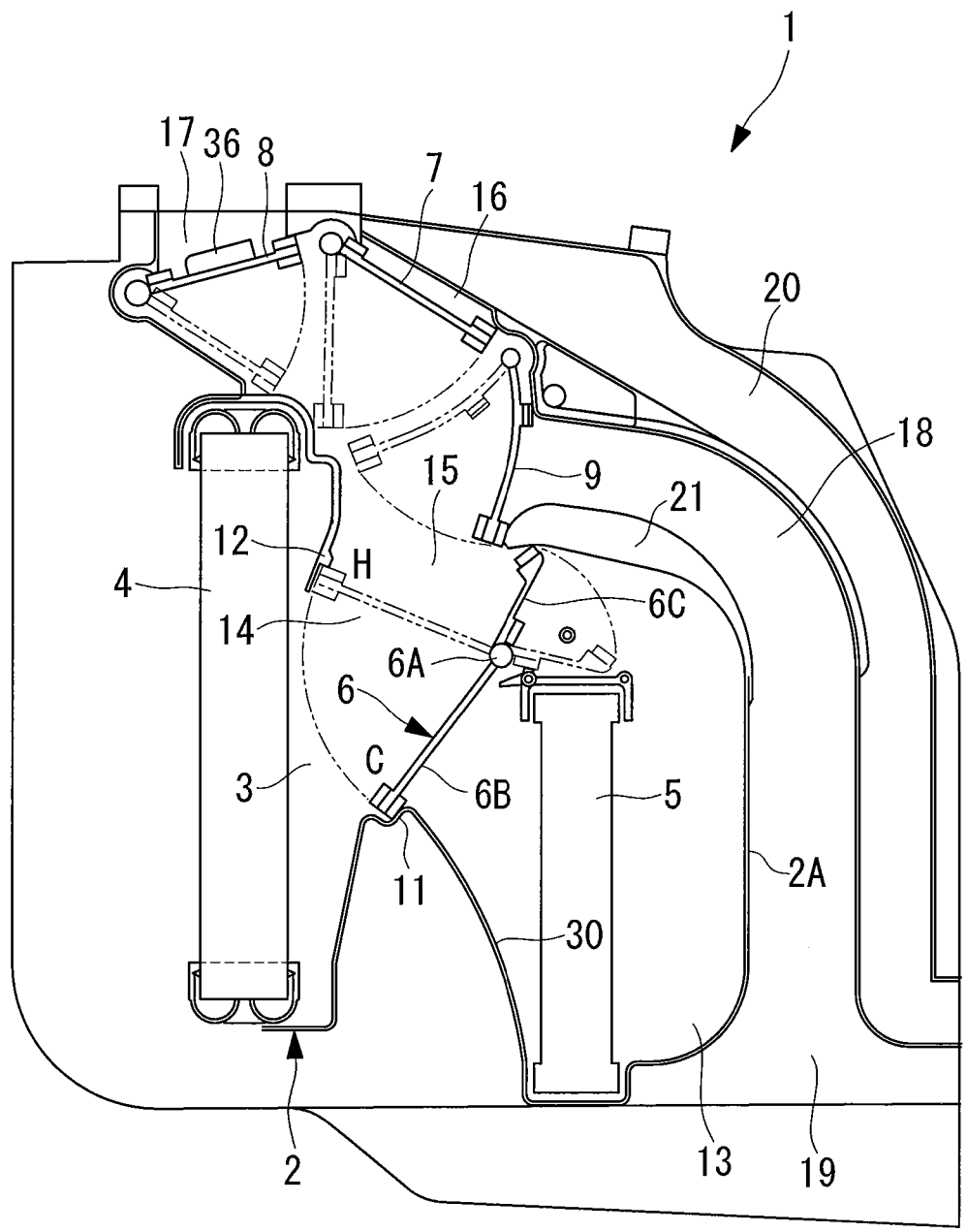
FIG. 1 is a longitudinal sectional view of a vehicle heating ventilation and air conditioning unit according to a first embodiment of the present invention.
Figure 2:
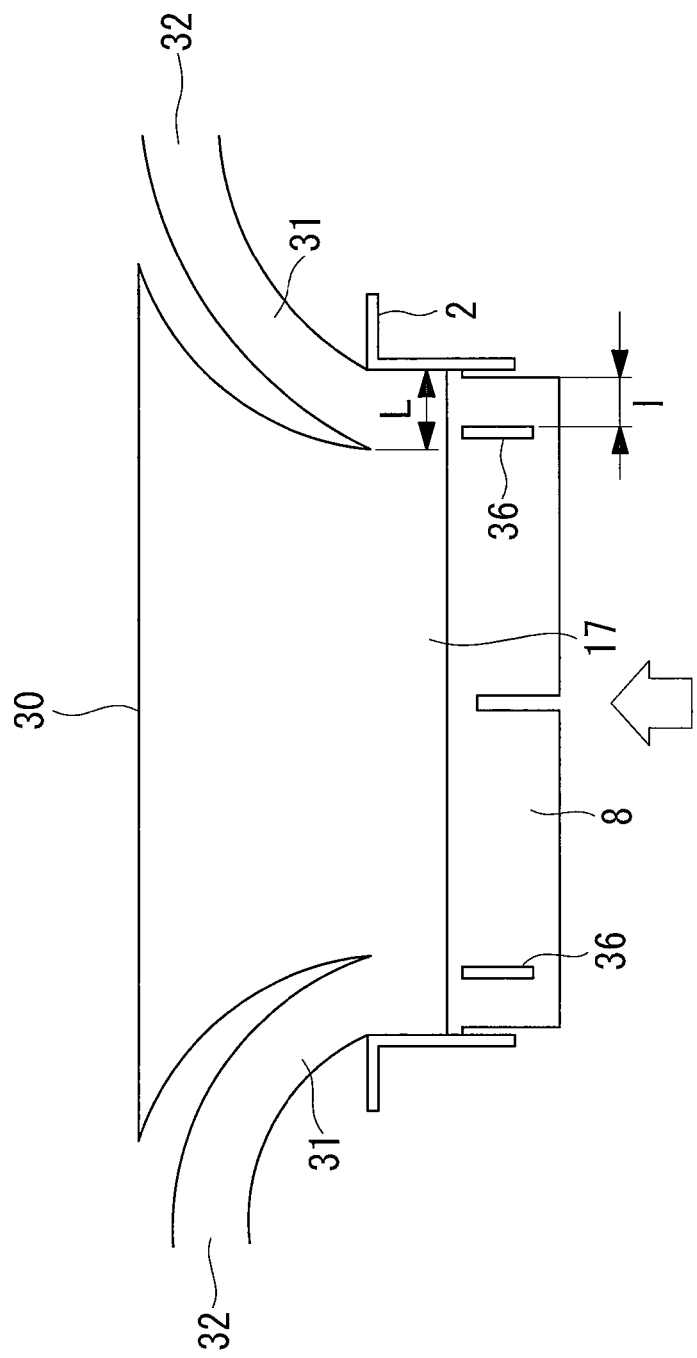
FIG. 2 is a configuration diagram showing the layout of a DEF blowing channel and side demister channels and a DEF damper of the vehicle heating ventilation and air conditioning unit shown in FIG. 1.
Figure 3:
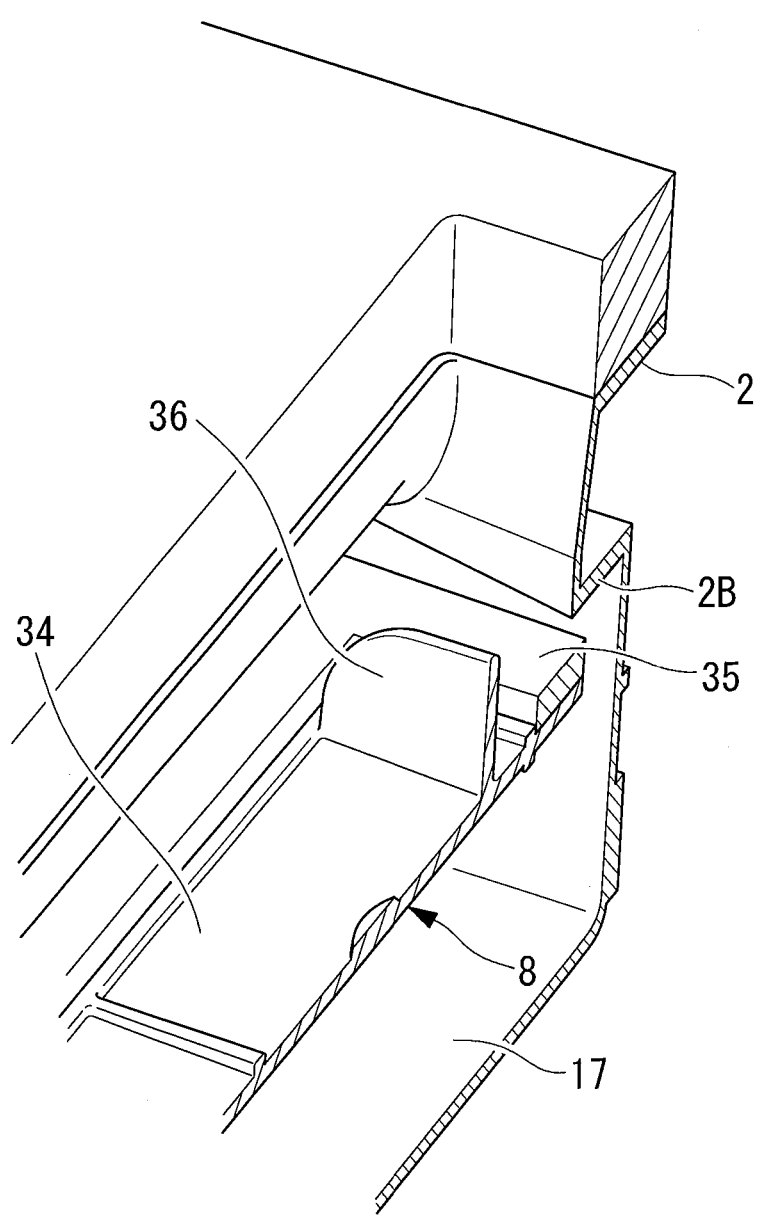
FIG. 3 is a perspective view taken from above, showing, in cut-away fashion, a DEF blowing channel portion of the vehicle heating ventilation and air conditioning unit shown in FIG. 1.

FIG. 1 shows a longitudinal sectional view of a vehicle heating ventilation and air conditioning unit 1 according to the first embodiment of the present invention, FIG. 2 shows a diagram showing the layout of a DEF blowing channel and side demister channels and a DEF damper, and FIG. 3 shows a perspective view taken from above, showing, in cut-away fashion, a DEF blowing channel portion. The vehicle heating ventilation and air conditioning unit (HVAC unit) 1 is provided with a unit case 2 made of resin, which is to be connected to a blower unit which is not shown.

An air channel 3 that allows the passage of an air flow sent from the blower unit is formed within the unit case 2. The unit case 2 is generally molded separately in a plurality of parts, and after an evaporator 4, a heater 5, an air-mix damper 6, a face damper 7, a DEF damper 8, and a foot damper 9 for switching among a plurality of blowing modes and so forth are accommodated and installed inside, the parts are assembled into one piece. The HVAC unit 1 is thus configured.

At the downstream side of the evaporator 4, the air channel 3 is narrowed by two sealing parts 11 and 12, located at upper and lower positions, against which the air-mix damper 6 is abutted, and further downstream, is branched into two channels, that is, a heater-side channel 13 where the heater 5 is installed and a bypass channel 14 that bypasses the heater 5. The heater-side channel 13 is configured so as to point upward at the downstream side of the heater 5 and rejoin the bypass channel 14 at an air-mix region 15 after passing the upper portion of the heater 5.

The air channel 3 is connected to each of a face blowing channel 16 and a DEF blowing channel 17 at the downstream side of the air-mix region 15, and is connected to a foot vent 19 via a foot blowing channel 18. The face blowing channel 16 is connected to each of rear seat vents, which are not shown, via rear-seat ducts 20 that are connected to both side portions of the face blowing channel 16.

The evaporator 4 constitutes a known refrigeration cycle together with a compressor, a condenser, an expansion valve and so forth, which are not shown, and conducts heat exchange between refrigerant circulated within the refrigeration cycle and air sent from the blower unit, not shown, to evaporate the refrigerant, thus cooling the air. This evaporator 4 with a square-outer shaped tube fin-type stacked heat exchanger having a predetermined thickness is mounted vertically in the HVAC unit 1 so as to cross the air channel 3 at the most upstream position in the air channel 3.

Hot water is circulated within the heater 5 through a cooling water circuit from a vehicle engine, which is not shown, and the heater 5 is arranged in the heater-side channel 13 and conducts heat exchange between the hot water and the air cooled at the evaporator 4 to heat the air. This heater 5 with a square-outer shaped tube fin-type stacked heat exchanger having a predetermined thickness is mounted vertically so as to cross the heater-side channel 13 substantially parallel to the evaporator 4.

The air-mix damper 6 is arranged between the evaporator 4 and the heater 5, and a rotation axis 6A is rotatably installed on the unit case 2 at the vicinity of the upper end portion of the heater 5. This air-mix damper 6 is a butterfly damper, and a plate-like damper part 6B is pivotable to any position between the maximum cooling position (the max-cool position) C where the distal portion of the plate-like damper part 6B is abutted against the sealing part 11, thereby fully closing the entrance to the heater-side channel 13, and the maximum heating position (the max-hot position) H where the distal portion of the plate-like damper part 6B is abutted against the sealing part 12, thereby fully closing the entrance of the bypass channel 14. On the other hand, a plate-like damper part 6C is pivoted integrally with the plate-like damper part 6B, thereby adjusting the degree of opening of the exit of the heater-side channel 13, and the air-mix damper 6 is configured so as to close the exit of the heater-side channel 13 at the maximum cooling position C.

Among the dampers 7, 8, and 9 for switching among the blowing modes, the face damper 7 is provided pivotably in the face blowing channel 16, the DEF damper 8 is provided pivotably in the DEF blowing channel 17, and the foot damper 9 is provided pivotably in the foot blowing channel 18. These dampers 7, 8, and 9 are configured so as to be capable of opening and closing each of the blowing channels by being moved in association with each other, and thus, it is possible to switch among a face mode where the face damper 7 is opened, a DEF mode where the DEF damper 8 is opened, a foot mode where the foot damper 9 is opened, a DEF/foot mode where both the DEF damper 8 and the foot damper 9 are opened, a bi-level mode where both the face damper 7 and the foot damper 9 are opened, and so forth.

The entrance of the rear-seat duct 20 is connected the adjacent face blowing channel 16 in the longitudinal direction (back-front direction of the vehicle), and thus the rear-seat duct 20 is configured so that the temperature-regulated cold air or hot air is guided toward the rear seat via the face damper 7. The heater-side channel 13 is defined by a partition 2A that is integral with the unit case 2, and the back surface side (opposite side of the heater-side channel) of the partition 2A is the foot blowing channel 18. The end portion of this partition 2A forming the exit of the heater-side channel 13 is provided with a teardrop-shaped portion 21 that has a smoothly curved shaped towards the air-mix region 15 as a whole and that is configured by combining several curved surfaces of different curvatures and flat surface having a straight cross-section.

In the HVAC unit 1 described above, as shown in FIG. 2, the DEF blowing channel 17 is provided with a defroster vent 30 that blows out the temperature-regulated air towards the windshield and, in addition to this, side demister channels 31 that guide the temperature-regulated air to the side window glass are separately formed on the both side portions of the DEF blowing channel 17. These side demister channels 31 have a width of dimension L in the width direction of the DEF blowing channel 17, are configured so as to be opened and closed together with the DEF blowing channel 17 by the DEF damper 8, and are in communication with side demister vents 32 that blow out the temperature-regulated air towards the side window glass.

As described above, the DEF damper 8 is not only configured to prevent and clear fogging of the windshield and the side window glass by being opened in the DEF mode and the DEF/foot mode to allow the flow of the temperature-regulated air into the DEF blowing channel 17 and the side demister channels 31, but is also set to a small degree of opening in the foot mode, which is a heating mode. Thus, the DEF damper 8 is configured so that the temperature-regulated air of the airflow corresponding to about 10 to 20% of the total airflow in the foot mode is blown out from the defroster vent 30 and the side demister vents 32 towards the windshield and the side window glass.

Figure 4:
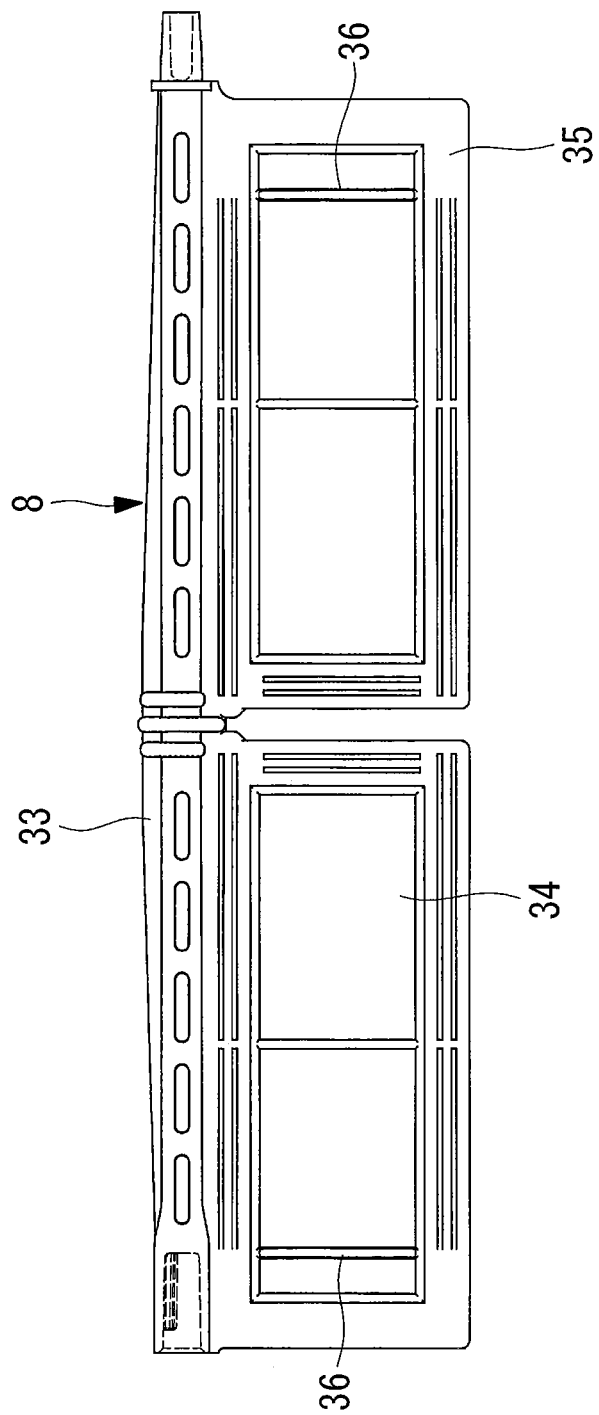
FIG. 4 is a plan view of a DEF damper of the vehicle heating ventilation and air conditioning unit shown in FIG. 1.
Figure 5:
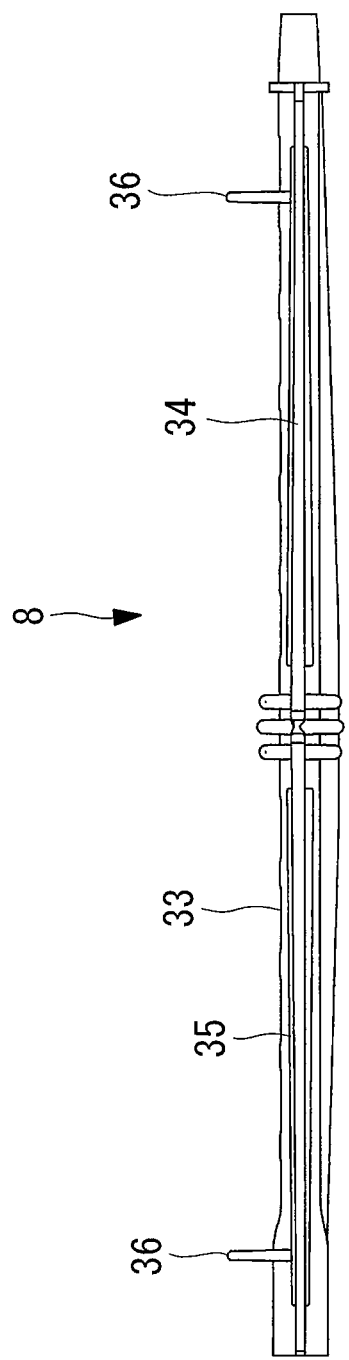
FIG. 5 is a side view showing the DEF damper shown in FIG. 4 from the distal end of a damper plate.

As shown in FIGS. 4 and 5, this DEF damper 8 is a door-like damper in which a rectangular-shaped damper plate 34 is molded integrally onto a rotation shaft 33 with resin material, and the damper plate 34 is provided with, on the periphery thereof, sealing members 35 that close the DEF blowing channel 17 and the side demister channels 31 by being abutted against a sealing surface 2B that is formed on the unit case 2 side. The DEF damper 8 is provided with baffle ribs 36 that are erected upright upwards and extending in the direction orthogonal to the width direction at the locations away from both end portions of the DEF damper 8 by distance 1 in the width direction.

As described above, the baffle ribs 36 are provided on the damper plate 34 at locations away from both end portions by the widthwise distance 1, and as shown in FIG. 2, these locations are locations located at substantially around 50% of the distance relative to the widthwise dimension L of the side demister channels 31, in other words locations where l=0.5 L. That is to say, if the widthwise dimension L of the side demister channels 31 is, for example, 40 mm, the baffle ribs 36 are provided at the locations about 20 mm away from both end portions of the damper plate 34. The height of the baffle ribs 36 is adjusted within the range so as not to protrude from the unit case 2, for example, on the order of ten and some mm. Further, the length thereof is, for example, on the order of thirty and some mm.

With the configuration described above, this embodiment affords the following effects and advantages.

The air flow sent from the blower unit, not shown, to the air channel 3 of the HVAC unit 1 is cooled by being subjected to heat exchange with the refrigerant while passing through the evaporator 3, and thereafter, the air flow is allowed to flow into the heater-side channel 13 and the bypass channel 14 according to the proportion of the airflow that is adjusted by the air-mix damper 6. The air flow that has been flown into the heater-side channel 13 side is heated by undergoing heat exchange with the hot water in the heater 5, and thereafter, is adjusted to the set temperature by being air-mixed with the cool air from the bypass channel 14 in the air-mix.

This temperature-regulated air is selectively blown out into the cabin from at least one of the face blowing channel 16, the DEF blowing channel 17, the foot blowing channel 18, and the rear-seat duct 20 in accordance with the blowing mode, such as the face mode, the DEF mode, the foot mode, the DEF/foot mode, the bi-level mode, and so forth, which are switched among by a plurality of dampers, that is, the face damper 7, the DEF damper 8, and the foot damper 9.

During this time, if the foot mode, which is a heating mode, is set, about 80 to 90% of the temperature-regulated air heated by the heater 5 is allowed to flow into the foot blowing channel 18 by opening the foot damper 9 and is blown out from the foot vent 19 to the vicinity of the legs of the driver. On the other hand, the remaining about 10 to 20% of the temperature-regulated air is allowed to escape towards the DEF blowing channel 17 through the foot damper 9, and is blown out towards the windshield and the side window glass from the defroster vent 30 and the side demister vents 32 by being passed the DEF damper 8 set to a small degree of opening, and then through the DEF blowing channel 17 and the side demister channels 31.

Here, when the temperature-regulated air that has flown along both side portions of the unit case 2 flows through the small gap between both end portions of the DEF damper 8 and the unit case 2, as shown in FIG. 3, the direction of the temperature-regulated air passing through the DEF damper 8 set to a small degree of opening is changed in the width direction by the sealing surface 2B of the unit case 2 against which both end portions of the DEF damper 8 are abutted, and then the temperature-regulated air flows in the width direction of the DEF damper 8 by being dragged by the temperature-regulated air flowing in the central portion of the DEF blowing channel 17 as the main stream. Therefore, it is difficult for the temperature-regulated air to flow into the side demister channels 31 formed at both side portions of the DEF blowing channel 17.

However, in this embodiment, since the baffle ribs 36 that guide the temperature-regulated air flowing in the width direction of the DEF damper 8 as described above to the side demister channels 31 are provided in the vicinity of both end portions of the DEF damper 8, it is possible to guide the temperature-regulated air of the airflow required to ensure window clearness of the side window glass into the side demister channels 31 when the DEF damper 8 of the DEF blowing channel 17 is set to a small degree of opening in the foot mode, and the temperature-regulated air is allowed to flow into the DEF blowing channel 17 and the side demister channels 31.

Thus, in order to prevent or clear fogging of the windshield and the side window glass in the foot mode, the temperature-regulated air of the required airflow can be reliably made to flow into the side demister channels 31 when the DEF damper 8 is set to a small degree of opening, and the temperature-regulated air is made to flow into the DEF blowing channel 17 and the side demister channels 31. Therefore, with the configuration in which just the baffle ribs 36 are added to the DEF damper 8, the performance of the side demister can be improved to increase window clearness of the side window glass, and at the same time, it is possible to solve the operational problem of manually switching the damper to the DEF/foot mode in order to ensure window clearness.

When the DEF damper 8 is set to a small degree of opening in the foot mode, which is a heating mode, by guiding the temperature-regulated air flowing in the width direction of the DEF damper 8 from the gap between both end portions of the DEF damper 8 and the unit case 2 to the side demister channels 31 by the baffle ribs 36, the airflow of the temperature-regulated air flowing towards the side demister channels 31 can be increased. Therefore, an airflow sufficient to ensure the performance of the demister can be supplied to the side demister channels 31 without increasing the proportion of the airflow to be supplied to the DEF blowing channel 17 and the side demister channels 31 relative to the airflow supplied to the foot blowing channel 18. Therefore, it is possible to ensure the performance of side demister and to maintain the heating performance simultaneously.

Since the baffle ribs 36 are provided at locations away from both end portions of the DEF damper 8 by the distance 1, which is substantially around 50% of the widthwise dimension L of the side demister channels 31, without increasing pressure loss (resistance) against the temperature-regulated air flowing in the width direction of the DEF damper 8 from the gap between both end portions of the DEF damper 8 and the unit case 2, it is possible to guide the temperature-regulated air into the side demister channels 31 so that the temperature-regulated air does not bypass the side demister channels 31. Therefore, temperature-regulated air of the adequate airflow can be guided to the side demister channels 31, and the performance of the side demister can be stabilized.

With the configuration in which the baffle ribs 36 are provided in an upright position on the sealing surface-side surface of the damper plate 34 of the DEF damper 8, it is possible to adjust the airflow of the temperature-regulated air to be guided to the side demister channels 31 by adjusting the vertical height of the baffle ribs 36 within a range such that they do not protrude from the unit case 2. Therefore, it is possible to optimize the airflow to be guided to the side demister channels 31 by adjusting the vertical height of the baffle ribs 36.

Since the baffle ribs 36 are provided in the direction orthogonal to the width direction of the damper plate 34 of the DEF damper 8, it is possible to effectively guide the temperature-regulated air flowing in the width direction of the DEF damper 8 from the gap between both end portions of the DEF damper 8 and the unit case 2 to the side demister channels 31 with the baffle ribs 36. In the DEF mode and the DEF/foot mode where the DEF damper 8 is opened to blow out the main stream of the temperature-regulated air from the DEF blowing channel 17 and the side demister channels 31, the baffle ribs 36 will not cause resistance, and therefore, the performance of parts other than the side demister will not be adversely affected.

Since the baffle ribs 36 are integrally molded with the DEF damper 8 with resin material, the number of processes in the production of the DEF damper 8 will not be increased even if the baffle ribs 36 are provided; therefore, an improvement in the performance of the side demister can be afforded while preventing an increase in the production costs.

Second Embodiment

Figure 6:
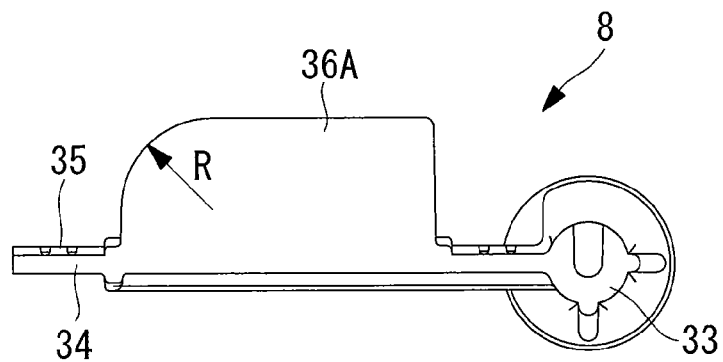
FIG. 6 is a side view showing an example of a DEF damper of a vehicle heating ventilation and air conditioning unit according to a second embodiment of the present invention, as viewed from the rotation shaft direction.
Figure 7:
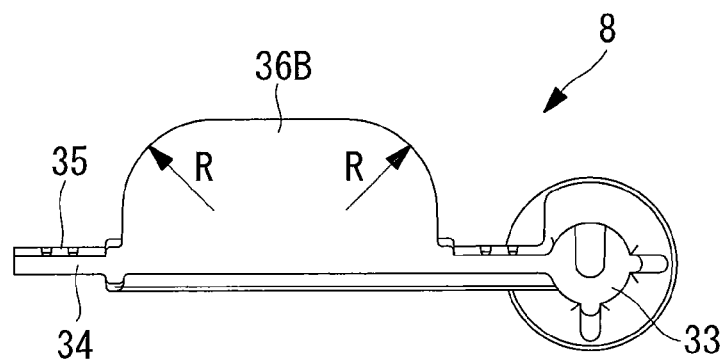
FIG. 7 is a side view showing a modification of the DEF damper of the vehicle heating ventilation and air conditioning unit according to the second embodiment of the present invention, as viewed from the rotation shaft direction.
Figure 8:
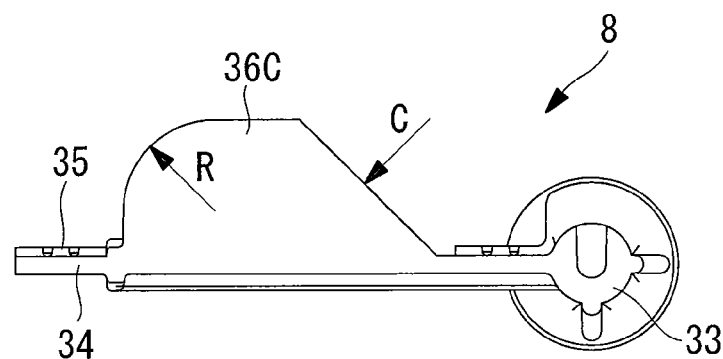
FIG. 8 is a side view showing another modification of the DEF damper of the vehicle heating ventilation and air conditioning unit according to the second embodiment of the present invention, as viewed from the rotation shaft direction.

Next, a second embodiment of the present invention will be described using FIGS. 6 to 8.

This embodiment differs from the first embodiment described above in the shapes of baffle ribs 36A to 36C. The other points are the same as in the first embodiment and the descriptions thereof are omitted. In this embodiment, as shown in FIG. 6, the baffle rib 36A is formed to have a smoothly rounded corner portion at the distal end of the damper plate 34, and the corner portion at the rotation shaft 33 is shaped into a substantially right-angled corner portion. As shown in FIG. 7, the baffle rib 36B is formed to have a smoothly rounded corner portion at the distal end of the damper plate 34, and the corner portion at the rotation shaft 33 is also rounded in a similar manner. As shown in FIG. 8, the baffle rib 36C is formed to have a smoothly rounded corner portion at the distal end of the damper plate 34, whereas the corner portion at the rotation shaft 33 is cut (C) downwards towards the rotation shaft 33.

As described above, the shape of the baffle rib can be modified into various shapes, as in the baffle ribs 36A to 36C, in consideration of the air-guiding properties and moldability. In particular, it is desirable to smoothly round the corner portion at the distal end of the damper plate 34 in the rib to prevent the rib from causing ventilation resistance in the DEF mode and the DEF/foot mode. When the DEF damper 8 is integrally molded of resin material, the corner portion at the rotation shaft 33 of the rib may be suitably cut (C) in order to ensure the space for mounting a cooling pipe that cools the rotation shaft 33 side in the mold, and even if provided with such a cut (C), the air-guiding performance will not be deteriorated greatly.

The present invention is not limited to the embodiments described above, and various modifications may be made within the scope of the invention. For example, although the baffle rib is provided in the direction orthogonal to the width direction, it may be provided at an angle or provided with curvature. The height and the length thereof may also be set to the optimum dimensions according to the HVAC unit 1 to which the ribs will be applied, and they are not limited to the above described embodiment. The baffle ribs are integrally molded with the DEF damper 8; however, a bonded configuration realized by bonding and so forth is also possible.

REFERENCE SIGNS LIST

1 vehicle heating ventilation and air conditioning unit
2 unit case
3 air channel
4 evaporator
5 heater
7 face damper
8 DEF damper
9 foot damper
16 face blowing channel
17 DEF blowing channel
18 foot blowing channel
31 side demister channels
36, 36A, 36B, 36C baffle rib
L widthwise dimension of side demister channels
l widthwise distance from both end portions

The invention claimed is:

1. A vehicle heating ventilation and air conditioning unit comprising:
    an evaporator configured to regulate temperature of an air flow;
    a heater mounted in an air channel from a DEF blowing channel;
    a face blowing channel;
    a foot blowing channel provided downstream of the evaporator and the heater into a cabin by opening and closing a DEF damper;
    a face damper;
    a foot damper;
    side demister channels provided at both side portions of the DEF blowing channel; and
    baffle ribs provided in the vicinity of both end portions of the DEF damper that opens and closes the DEF blowing channel and the side demister channels simultaneously, wherein
    the vehicle heating ventilation and air conditioning unit selectively blows out the air flow, the side demister channels guide the temperature-regulated air to side window glass, and the baffle ribs guide the temperature-regulated air to the side demister channels; and the baffle ribs are provided at 50% of the width of the side demister channels from both end portions of the DEF damper in a direction orthogonal to axis of rotation of the DEF damper.

2. The vehicle heating ventilation and air conditioning unit according to claim 1, wherein the baffle ribs have a function of guiding the temperature-regulated air flowing in the width direction of the DEF damper to the side demister channels from a gap between both end portions of the DEF damper and a unit case, when the DEF damper is set to a small degree of opening in a foot mode where the foot damper is opened and the temperature-regulated air is blown out from the foot blowing channel.

3. The vehicle heating ventilation and air conditioning unit according to claim 1, wherein the baffle ribs are provided on a sealing surface-side surface of the DEF damper in an upright position.

4. The vehicle heating ventilation and air conditioning unit according to claim 1, wherein the baffle ribs are integrally molded with the DEF damper with resin material.

\* \* \* \* \*